US012580182B2

(12) United States Patent
Homma et al.

(10) Patent No.: US 12,580,182 B2
(45) Date of Patent: Mar. 17, 2026

(54) COATED CATHODE ACTIVE MATERIAL, METHOD OF PREPARING THE SAME, AND CATHODE AND NON-AQUEOUS ELECTROLYTE SECONDARY BATTERY EACH INCLUDING THE SAME

(71) Applicants: Samsung Electronics Co., Ltd., Suwon-si (KR); TOHOKU UNIVERSITY, Sendai (JP)

(72) Inventors: Itaru Homma, Miyagi (JP); Tomoyuki Tsujimura, Kanagawa-ken (JP); Nobuyoshi Yashiro, Kanagawa-ken (JP); Guohao Yuan, Miyagi (JP)

(73) Assignees: SAMSUNG ELECTRONICS CO., LTD., Gyeonggi-Do (KR); TOHOKU UNIVERSITY, Sendai (JP)

( * ) Notice: Subject to any disclaimer, the term of this patent is extended or adjusted under 35 U.S.C. 154(b) by 778 days.

(21) Appl. No.: 17/856,016

(22) Filed: Jul. 1, 2022

(65) Prior Publication Data

US 2023/0024868 A1 Jan. 26, 2023

(30) Foreign Application Priority Data

Jul. 7, 2021 (JP) ................................ 2021-113124
Sep. 23, 2021 (KR) ........................ 10-2021-0125869

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0471* (2013.01); *H01M 4/505* (2013.01);
(Continued)

(58) Field of Classification Search
CPC .................................................... H01M 4/366
See application file for complete search history.

(56) References Cited

U.S. PATENT DOCUMENTS 7,993,782 B2 8/2011 Takada et al.
8,968,939 B2 3/2015 Tsuchida et al.
(Continued)

FOREIGN PATENT DOCUMENTS

CN 108539250 A 9/2018
CN 110277539 A * 9/2019 ........ H01M 10/0525
(Continued)

OTHER PUBLICATIONS

Mäntymäki, et. al., Studies on Li3AlF6 thin film deposition utilizing conversion reactions of thin films, 636 Thin Solid Films, 26-33, (Aug. 31, 2017) (Year: 2017).*
(Continued)

*Primary Examiner* — Nicole M. Buie-Hatcher
*Assistant Examiner* — Krishna R Hammond
(74) *Attorney, Agent, or Firm* — CANTOR COLBURN LLP

(57) ABSTRACT

A coated cathode active material, a method of preparing the same, and a cathode and a non-aqueous electrolyte secondary battery, each including the same, the coated cathode active material including: a cathode active material particle and a coating layer on a surface of the cathode active material particle, the coating layer including $LiAlF_4$, LiF, and $Li_3AlF_6$.

22 Claims, 5 Drawing Sheets

(51) Int. Cl.
*H01M 4/04* (2006.01)
*H01M 4/505* (2010.01)
*H01M 4/525* (2010.01)
*H01M 4/58* (2010.01)
*H01M 10/0525* (2010.01)

(52) U.S. Cl.
CPC ........... *H01M 4/525* (2013.01); *H01M 4/582* (2013.01); *H01M 10/0525* (2013.01); *H01M 2004/021* (2013.01); *H01M 2004/028* (2013.01)

(56) References Cited

U.S. PATENT DOCUMENTS

| | | | | |
|---|---|---|---|---|
| 9,214,674 | B2 | 12/2015 | Yoshida et al. | |
| 9,391,328 | B2 | 7/2016 | Tsuchida et al. | |
| 2009/0087362 | A1 | 4/2009 | Sun et al. | |
| 2013/0071745 | A1* | 3/2013 | Mun | H01M 10/052 |
| 2013/0309580 | A1 | 11/2013 | Seiji et al. | |
| 2014/0227578 | A1 | 8/2014 | Yoshida et al. | |
| 2014/0227606 | A1 | 8/2014 | Suzuki et al. | |
| 2014/0287324 | A1 | 9/2014 | Tsuchida et al. | |
| 2016/0049646 | A1 | 2/2016 | Fujiki et al. | |
| 2016/0079597 | A1 | 3/2016 | Fujiki et al. | |
| 2017/0179481 | A1 | 6/2017 | Yamada et al. | |
| 2018/0151865 | A1* | 5/2018 | Song | H01M 4/505 |
| 2018/0316057 | A1 | 11/2018 | Sasaki | |
| 2018/0323435 | A1* | 11/2018 | Lim | H01M 10/0525 |
| 2019/0044146 | A1 | 2/2019 | Ito et al. | |
| 2019/0207220 | A1 | 7/2019 | Cho et al. | |
| 2020/0152976 | A1 | 5/2020 | Cui et al. | |
| 2021/0159485 | A1* | 5/2021 | Ji | H01M 4/1395 |
| 2022/0109185 | A1 | 4/2022 | Asano et al. | |
| 2022/0311047 | A1 | 9/2022 | Yashiro et al. | |

FOREIGN PATENT DOCUMENTS

| | | | | |
|---|---|---|---|---|
| CN | 111509222 | A * | 8/2020 | H01M 10/052 |
| JP | 44007329 | B | 3/1969 | |
| JP | 2010282948 | A | 12/2010 | |
| JP | 2012089406 | A | 5/2012 | |
| JP | 6287739 | B2 | 9/2013 | |
| JP | 5455766 | B2 | 3/2014 | |
| JP | 2014116129 | A | 6/2014 | |
| JP | 2014116149 | A | 6/2014 | |
| JP | 5578280 | B2 | 8/2014 | |
| JP | 2015072818 | A | 4/2015 | |
| JP | 2015088383 | A | 5/2015 | |
| JP | 5737415 | B2 | 6/2015 | |
| JP | 2015201372 | A | 11/2015 | |
| JP | 2015533257 | A | 11/2015 | |
| JP | 2016024907 | A | 2/2016 | |
| JP | 2016042417 | A | 3/2016 | |
| JP | 2016062683 | A | 4/2016 | |
| JP | 2016081822 | A | 5/2016 | |
| JP | 2018186077 | A | 11/2018 | |
| JP | 6534078 | B1 | 6/2019 | |
| JP | 2021021800 | A | 2/2021 | |
| JP | 2021050120 | A | 4/2021 | |
| KR | 20060109305 | A | 10/2006 | |
| KR | 20130030660 | A | 3/2013 | |
| KR | 20180106978 | A | 10/2018 | |
| KR | 20200024025 | A | 3/2020 | |
| WO | 2007004590 | A1 | 1/2007 | |
| WO | 2012105048 | A1 | 8/2012 | |
| WO | 2012157119 | A1 | 11/2012 | |
| WO | 2013046443 | A1 | 4/2013 | |
| WO | 2013073038 | A1 | 5/2013 | |
| WO | 2014013837 | A1 | 1/2014 | |
| WO | 2018025582 | A1 | 2/2018 | |
| WO | 2018123479 | A1 | 7/2018 | |
| WO | WO-2020047228 | A1 * | 3/2020 | H01M 10/052 |

OTHER PUBLICATIONS

Cao, Huiyao et al., "Phase Component-controllable Synthesis of Layered-Spinel Composite Materials as High- Performance Cathode for Lithium-ion Battery," Electrochemistry, (2016) pp. 407-413, vol. 84.

Liang, Gemeng et al., "Along Cycle-Life High-Voltage Spinel Lithium-Ion Battery Electrode Achieved by Site-Selective Doping,"Angewandte Chemie Int. Ed. (2020), pp. 10681-10689, vol. 132.

Liu, Bo et al, "High-Throughput Computational Screening of Li-Fluorides for Battery Cathode Coatings," ACS Sustainable Chemistry Engineering, Dec. 16, 2019, pp. 948-957, vol. 8.

Liu, Dilong et al., "Improved cycling performance of 5 V spinel LiMn1.5Ni0.5O4 by amorphous FePO4 coating," Journal of Power Sources (2012) pp. 333-338, vol. 219.

Wang, Changhong et al, "Interface-assisted in-situ growth of halide electrolytes eliminating interfacial challenges of all-inorganic solid-state batteries," Nano Energy, (2020), pp. 105015-105020, vol. 76.

Zhao, Shuoqing et al, "Aegis of Lithium-Rich Cathode Materials via Heterostructured LiA1F4Coating for High-Performance Lithium-Ion Batteries," ACS Applied Materials & Interfaces, 2018, pp. 33260-33268, vol. 10.

Jin Xie et al., "Atomic Layer Deposition of Stable LIALF4 Lithium Ion Conductive Interfacial Layer for Stable Cathode Cycling", ACS Nano 2017, 11, pp. 7019-7027, Jul. 30, 2017.

* cited by examiner

COATED CATHODE ACTIVE MATERIAL, METHOD OF PREPARING THE SAME, AND CATHODE AND NON-AQUEOUS ELECTROLYTE SECONDARY BATTERY EACH INCLUDING THE SAME

CROSS-REFERENCE TO RELATED APPLICATIONS

This application claims priority to and the benefit of Japanese Patent Application No. 2021-113124, filed on Jul. 7, 2021, in the Japan Patent Office, and Korean Patent Application No 10-2021-0125869, filed on Sep. 23, 2021, in the Korean Intellectual Property Office, and all the benefits accruing therefrom under 35 U.S.C. § 113, the contents of which in their entirety are herein incorporated by reference.

BACKGROUND

1. Field

The present disclosure relates to a coated cathode active material, a method of preparing the same, and a cathode and a non-aqueous electrolyte secondary battery, each including the coated cathode active material.

2. Description of the Related Art

Non-aqueous electrolyte secondary batteries such as lithium-ion secondary batteries have a high operating voltage of, for example, 4.5 volts (V).

When a lithium-ion secondary battery has a high operating voltage, a side reaction may occur between a cathode active material and a non-aqueous electrolyte. The side reaction may produce a resistive component at the interface between the cathode active material and the non-aqueous electrolyte, thus causing a deterioration in battery performance, such as a reduction in battery capacity, a reduction in cycle retention rate, or the like. There remains a need for a cathode active material having improved stability in the presence of a non-aqueous electrolyte.

SUMMARY

An embodiment provides a coated cathode active material for a non-aqueous secondary battery, capable of improving battery capacity and capacity retention.

An embodiment provides a cathode including the coated cathode active material described herein.

An embodiment provides a non-aqueous secondary battery including a cathode containing the coated cathode active material described herein.

Additional aspects will be set forth in part in the description which follows and, in part, will be apparent from the description, or may be learned by practice of the presented embodiments of the disclosure.

According to an embodiment, provided is a coated cathode active material including: a cathode active material particle; and a coating layer on a surface of the cathode active material particle, wherein the coating layer includes $LiAlF_4$, LiF, and $Li_3AlF_6$.

According to an embodiment, provided is a cathode including the coated cathode active material described herein.

According to an embodiment, provided is a non-aqueous electrolyte secondary battery including: a cathode containing the coated cathode active material described herein; an anode; and an electrolyte interposed between the cathode and the anode.

The electrolyte may include a solid electrolyte. The solid electrolyte may include a sulfide solid electrolyte, an oxide solid electrolyte, a halide solid electrolyte, a nitride-based solid electrolyte, or a combination thereof.

The electrolyte may be a halide based solid electrolyte, and the halide-based solid electrolyte may include $Li_3InCl_6$.

According to an embodiment, provided is a method of preparing a coated cathode active material, the method including: mixing a cathode active material, a lithium precursor, an aluminum precursor, and a fluoride precursor to obtain a coated cathode active material composition; treating the coated cathode active material composition at about 60° C. to about 95° C. to obtain a precursor, and heat-treating the precursor, to prepare the coated cathode active material described herein.

The lithium precursor may include lithium nitride, the aluminum precursor may include aluminum nitrate, and the fluoride precursor may include ammonium fluoride.

The heat treatment may include heat-treating at about 300° C. to about 500° C. The method may further include before the heat-treating of the precursor vacuum-drying the precursor.

The mixing may include mixing for 8 hours or less at a temperature of about 70° C. to about 90° C.

The cathode active material particle may include a first cathode active material particle, and a second cathode active material particle, and the coating layer may be on a surface of the first cathode active material particle, a surface of the second cathode active material particle, or a surface of the first cathode active material particle and a surface of the second cathode active material particle. In an embodiment, the coating layer may be on a surface of the first cathode active material particle and a surface of the second cathode active material particle.

According to an embodiment, provided is a non-aqueous electrolyte secondary battery including a cathode including a cathode active material particle including $LiCoO_2$. $Li_{a1}Ni_{x1}Co_{y1}Al_{z1}O_2$, wherein $0.9 \leq a1 \leq 1.2$, $0 \leq x1 < 1$, $0 \leq y1 < 1$, and $0 \leq z1 < 1$, $Li_{a2}Ni_{x2}Co_{y2}Mn_{z2}O_2$, wherein $0.9 \leq a2 \leq 1.2$, $0 \leq x2 < 1$, $0 \leq y2 < 1$, and $0 \leq z2 < 1$, or a combination thereof, and a coating layer including $LiAlF_4$, LiF, and $Li_3AlF_6$ on a surface of the cathode active material particle; an anode; and a solid electrolyte including a halide solid electrolyte interposed between the cathode and the anode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
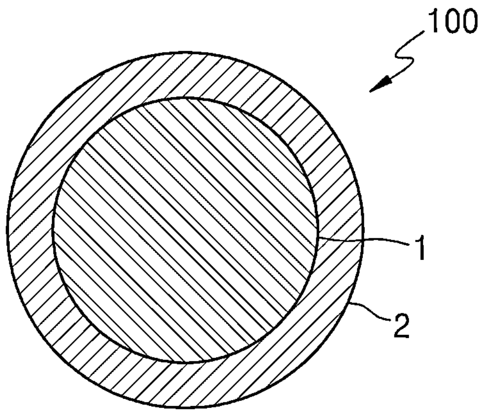
FIG. 1 is a schematic view showing an embodiment of a coated cathode active material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element." unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Thus, the regions illustrated in the figures are schematic in nature and their shapes are not intended to illustrate the precise shape of a region and are not intended to limit the scope of the present claims.

To reduce side reaction that may occur between a cathode active material and a non-aqueous electrolyte of a lithium-ion secondary battery, the cathode active material may be coated with a coating layer.

Hereinafter, detailed structures of secondary batteries will be described.

The prevent inventors have surprisingly discovered that a coated cathode active material for a non-aqueous electrolyte secondary battery, and a non-aqueous electrolyte secondary battery containing the coated cathode active material in which a cathode active material is coated with a coating layer containing certain components can provide improved battery capacity and capacity retention.

According to an embodiment, a coated cathode active material for a non-aqueous electrolyte secondary battery includes: a cathode active material particle; and a coating layer coating the surface of the cathode active material particle, wherein the coating layer contains $LiAlF_4$, LiF, and $Li_3AlF_6$.

The coated cathode active material according to an embodiment may further improve the battery capacity and capacity retention of a non-aqueous electrolyte secondary battery provided with a cathode containing the coated cathode active material.

The coating layer may have a thickness of about 0.6 nanometers (nm) to about 9 nm.

In addition, when analyzed by X-ray photoelectron spectroscopy, the coating layer may exhibit an $F_{1s}$, spectrum having a central position at about 685.05 electronvolts (eV) to about 685.60 eV.

In the coating layer, an amount of $LiAlF_4$ may be about 30 weight percent (wt %) to about 80 wt %, for example, about 35 wt % to about 75 wt % or about 40 wt % to about 65 wt %, an amount of LiF may be about 1 wt % to about 30 wt %, for example, about 3 wt % to about 20 wt % or about 5 wt % to about 10 wt %, and an amount of $Li_3AlF_6$ may be about 1 wt % to about 70 wt %, for example, about 10 wt % to about 60 wt % or about 25 wt % to about 55 wt %, each based on a total weight of the coating layer.

When the amount of $LiAlF_4$ in the coating layer is within the disclosed range, a non-aqueous electrolyte secondary battery with improved cycle characteristics may be manufactured. When the amount of $Li_3AlF_6$ in the coating layer is within the disclosed range, a coated cathode active material with improved high-voltage characteristics may be manufactured.

A total amount of fluoride in the coating layer may be about 0.01 to about 15 parts by weight, about 0.5 to about 15 parts by weight, about 1 to about 15 parts by weight, about 5 to about 15 parts by weight, about 9 to about 15 parts by weight, or about 10 to 15 parts by weight, with respect to 100 parts by weight of a total weight of the coating layer. When the total amount of fluoride in the coating layer is within these ranges, the coated cathode active material with improved cycle characteristics and high voltage characteristics may be manufactured.

In the coated cathode active material according to an embodiment, the greater the specific surface area of the coated cathode active material, the further the charge/discharge capacity of the non-aqueous secondary electrolyte may increase. Therefore, to increase the specific surface area of the coated cathode active material, the average secondary particle diameter of the coated cathode active material may be selected to be about 10 micrometers (μm) or less, for example, about 1 μm to about 10 μm.

To permit use at high voltage, the cathode active material may have a spinel structure. The cathode active material may be a lithium salt of a ternary transition metal oxide, for example, $LiNi_{x1}Co_{y1}Al_{z1}O_2$ (wherein $0 \le x1 < 1$, $0 < y1 < 1$, and $0 < z1 < 1$) $LiNi_{x2}Co_{y2}Mn_{z2}O_2$ (wherein $0 \le x2 < 1$, $0 < y2 < 1$, and $0 < z2 < 1$), or a combination thereof.

Provided is a non-aqueous electrolyte secondary battery including the coated cathode active material having the characteristics described herein.

1. Basic Structure of Non-Aqueous Electrolyte Secondary Battery

A non-aqueous electrolyte secondary battery according to an embodiment may include a cathode, an anode, a separator, and a non-aqueous electrolyte. The non-aqueous electrolyte secondary battery may be, for example, a lithium-ion secondary battery.

According to an embodiment, a maximum charge voltage (oxidation-reduction potential) of the lithium-ion secondary battery may be, for example, about 4.0 V (vs. $Li/Li^+$) to about 5.0 V, for example, about 4.2 V to about 5.0 V. The shape of the lithium-ion secondary battery is not specifically limited, but may be of a cylindrical, prismatic, laminate, or button type.

1-1. Cathode

The cathode may include a cathode current collector and a cathode mixture layer formed on the cathode current collector.

The cathode current collector may be any suitable conductive material, and may have, for example, a plate shape or a foil shape, and may consist of aluminum, stainless steel, nickel-coated steel, or the like.

The cathode mixture layer includes at least a cathode active material 1, and may further include a conductive material and a binder for a cathode, wherein the binder binds the cathode active material 1 and the conductive material onto the cathode current collector.

The cathode active material 1 used in the cathode mixture layer, according to an embodiment, is a coated cathode active material 100 coated with a coating layer 2, as illustrated in FIG. 1.

The cathode active material 1 may be, for example, a lithium-containing transition metal oxide or solid solution oxide, and is not specifically limited provided that it is a material capable of electrochemically adsorbing and dissolving, e.g., intercalating and deintercalating lithium ions.

The lithium-containing transition metal oxide may be, for example, $Li_{1.0}Ni_{0.88}Co_{0.1}Al_{0.01}Mg_{0.01}O_2$. Other examples of the lithium-containing transition metal oxide include a composite oxide comprising Li and Co, such as $LiCoO_2$, a composite oxide comprising Li, Ni, Co, and Mn, such as $LiNi_{x2}Co_{y2}Mn_{z2}O_2$, a composite oxide comprising Li and Ni, such as $LiNiO_2$, or a composite oxide comprising Li and Mn, such as $LiMn_2O_4$.

The solid solution oxide may be, for example, $LiaMn_xCo_yNi_zO_2$ (wherein $1.150 \le a \le 1.430$, $0.45 \le x \le 0.6$, $0.10 \le y \le 0.15$, and $0.20 \le z \le 0.28$), $LiMn_{1.5}Ni_{0.5}O_4$, or the like. The cathode active material 1 may be, among the disclosed materials, a lithium transition metal oxide that is represented by $Li_{a1}Ni_{x1}Co_{y1}Al_{z1}O_2$ (wherein $0.9 \le a1 \le 1.2$, $0 \le x1 < 1$, $0 \le y1 < 1$, and $0 \le z1 < 1$) or $Li_{a2}Ni_{x2}Co_{y2}Mn_{z2}O_2$ (wherein $0.9 \le a2 \le 1.2$, $0 \le x2 < 1$, $0 \le y2 < 1$, and $0 \le z2 < 1$). In addition, the cathode active material may have, for example, a spinel crystalline structure. In addition, these compounds may be used alone, a mixture of the compounds, or a combination thereof. The shape of the cathode active material 1 is not specifically limited, and the cathode active material 1 may have, for example, a particle form.

The cathode active material particle may be, for example, a 5 volt (5V)-class high-potential cathode active material.

The coating layer 2 will be described herein.

LiF, $Li_3AlF_4$, and $LiAlF_4$, which constitute the coating layer 2, are uniformly distributed.

The conductive material is not specifically limited as long as it is capable of increasing the conductivity of the cathode. The conductive material may be, for example, a material containing at least one of carbon black, natural graphite, artificial graphite, or fibrous carbon.

Examples of the carbon black may include furnace black, channel black, thermal black, ketjen black, acetylene black, or the like.

Examples of the fibrous carbon may include carbon nanotubes, graphene, carbon nanofiber, or the like.

The amount of the conductive material is not specifically limited, and may be an amount suitable for application to the cathode mixture layer of a non-aqueous electrolyte secondary battery, e.g., 0.1 wt % to 3 wt %, based on a total weight of the cathode.

The binder for the cathode may be, for example, a fluoride-containing resin such as polyvinylidene fluoride or like, an ethylene-containing resin such as styrene-butadiene rubber or the like, an ethylene-propylene-diene terpolymer, an acrylonitrile-butadiene rubber, a fluororubber, polyvinyl acetate, polymethylmethacrylate, polyethylene, polyvinyl alcohol, carboxymethylcellulose or a carboxymethylcellulose derivative (e.g., a salt of carboxymethylcellulose, or the like), nitrocellulose, or a combination thereof. The binder for the cathode may be any suitable material capable of binding the cathode active material 1 and the conductive material to the cathode current collector, and is not specifically limited.

1-2 Anode

The anode includes an anode current collector and an anode mixture layer formed on the anode current collector.

The anode current collector may be any suitable conductive material, and may have, for example, a plate shape or a foil shape, and may comprise copper, stainless steel, nickel-coated steel, or the like.

The anode mixture layer includes at least an anode active material, and may further include a conductive material and a binder for an anode, wherein the binder binds the anode active material and the conductive material onto the anode current collector.

The anode active material is not specifically limited provided that it is a material capable of electrochemically adsorbing and dissolving, or intercalating or deintercalating, or alloying and dealloying lithium ions. For example, the anode active material may be a graphite active material (an artificial graphite, a natural graphite, a mixture of artificial graphite and natural graphite, a natural graphite coated with an artificial graphite, and the like), an Si-based active material or Sn-based active material (for example, a mixture of particulates of silicon (Si) or tin (Sn) or an oxide thereof and a graphite active material, Si or Sn particulates, or a Si- or Sn-based alloy), a lithium metal, a titanium oxide compound such as $Li_4Ti_5O_{12}$, lithium nitride, or the like. As the anode active material, the disclosed anode active materials may be used alone or in combination of at least two thereof. The silicon oxide may be represented by, for example, $SiO_x$ (wherein $0 \le x \le 2$).

The anode active material layer in a secondary battery may include a metal or metalloid anode active material, a carbonaceous anode active material, or a combination thereof. In an embodiment, the anode active material layer may contain an anode active material with large irreversible capacity.

The anode active material layer may include, for example, a silicon-based anode active material. The silicon-based anode active material may include silicon, a silicon-carbon composite, $SiO_x$ (wherein $0 \le x < 2$), an Si-Q alloy (wherein Q is an element selected from an alkali metal, an alkaline earth metal, a Group 13 element, a Group 14 element, a Group 15 element, a Group 16 element, a transition metal, a rare earth element, or a combination thereof, but is not Si), or a combination thereof. The silicon-based anode active material may be a mixture of at least one of these materials and $SiO_2$.

The element Q may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, or a combination thereof.

The anode active material layer may include: a silicon-carbon composite including silicon particles and a first carbonaceous material; a silicon-carbon composite including a core in which silicon particles and a second carbonaceous material are mixed, and a third carbonaceous material surrounding the core; or a combination thereof.

The first carbonaceous material to the third carbonaceous material may each independently be crystalline carbon, amorphous carbon, or a combination thereof. The silicon-carbon composite may include a core including silicon particles and a crystalline carbon, and an amorphous-carbon coating layer located on the surface of the core.

When the silicon-carbon composite as described herein is used as the silicon-based anode active material, the secondary battery may exhibit high capacity and implement stable cycle characteristics.

In the silicon-carbon composite including silicon particles and a first carbonaceous material, an amount of the silicon particles may be about 30 wt % to about 70 wt %, for example, or about 40 wt % to about 50 wt %, based on a total weight of the composite. An amount of the first carbonaceous material may be about 70 wt % to about 30 wt %, for example, about 50 wt % to about 60 wt %, based on a total weight of the composite. When the amounts of the silicon particles and the first carbonaceous material are within the disclosed ranges, the secondary battery may exhibit high-capacity characteristics and at the same time may exhibit excellent lifespan characteristics.

In an embodiment, the silicon-based anode active material may include the silicon-carbon composite including a core in which silicon particles and a second carbonaceous material are mixed, and a third carbonaceous material surrounding the core. When the silicon-carbon composite is used, the secondary battery may have a very high capacity and an improved capacity retention, and particularly, may have improved high-temperature lifespan characteristics. The third carbonaceous material may have a thickness of about 5 nm to about 100 nm. In addition, with respect to 100 parts by weight of the silicon-carbon composite, an amount of the third carbonaceous material included may be about 1 wt % to about 50 wt %, and an amount of the silicon particles included may be about 30 wt % to about 70 wt %, based on 100 parts by weight of the silicon-carbon composite. An amount of the second carbonaceous material included may be about 20 wt % to about 69 wt %, based on a total weight of the silicon-based anode active material. When the amounts of the silicon particles, the third carbonaceous material, and the second carbonaceous material are within the disclosed ranges, the secondary battery may have excellent discharge capacity and have improved capacity retention.

The silicon particles may have an average particle diameter of about 10 nm to about 30 μm, for example, about 10 nm to about 1000 nm, or about 20 nm to about 150 nm. When the average particle diameter of the silicon particles are within the disclosed ranges, volume expansion, which occurs during charging and discharging, may be suppressed, and interruption of electron migration due to particle breaking during charging and discharging may be prevented. Particle diameter may be determined by SEM analysis or laser light scattering.

In the silicon-carbon composite, for example, the second carbonaceous material may be crystalline carbon, and the third carbonaceous material may be amorphous carbon. That is, the silicon-carbon composite may be a silicon-carbon composite including a core, which includes silicon particles and crystalline carbon, and an amorphous carbon coating layer located on the surface of the core.

The crystalline carbon may include artificial graphite, natural graphite or a combination thereof. The amorphous carbon may include pitch carbon, soft carbon, hard carbon, mesophase pitch carbide, calcined cokes, carbon fiber, or a combination thereof. A precursor of the amorphous carbon may be a coal-based pitch, a mesophase pitch, a petroleum-based pitch, a coal-based oil, a petroleum-based heavy oil, or a polymer resin such as a phenol resin, a furan resin, a polyimide resin, or a combination thereof.

The silicon-carbon composite may include about 10 wt % to about 60 wt % of silicon and about 40 wt % to 90 wt % of a carbonaceous material, with respect to 100 parts by weight of the silicon-carbon composite. In addition, in the silicon-carbon composite, an amount of the crystalline carbon may be about 10 wt % to about 70 wt %, with respect to a total weight of the silicon-carbon composite, and an amount of the amorphous carbon may be about 20 wt % to about 40 wt %, with respect to a total weight of the silicon-carbon composite.

The silicon particles may be in an oxidized form, wherein the atomic content ratio of Si:O in silicon particles, which indicates the degree of oxidation, may be present in a weight ratio of about 99:1 to about 33:66 by weight. The silicon particles may be $SiO_x$ particles, in which x may be in a range of greater than 0 and less than 2. Unless stated otherwise, the average particle diameter (D50) herein means the diameter of particles in a cumulative volume at 50% by volume in a particle size distribution.

In addition, depending on the compositions of the anode active material and the anode mixture layer, the disclosed anode current collector may be omitted.

The conductive material is not specifically limited, and may be any suitable material for increasing the conductivity of the anode. For example, the same conductive materials with respect to the cathode may be used.

The binder for the anode may be any suitable material capable of binding the anode active material and the conductive material to the anode current collector, and is not particularly limited. For example, the same binders with respect to the cathode may be used.

1-3 Separator

The separator is not particularly limited, and any suitable separator for lithium-ion secondary batteries may be used. As the separator, a porous membrane or non-woven fabric which exhibits excellent high-rate discharge performance may be used alone or in combination. A resin constituting the separator may be, for example, polyolefin-based resin, such as polyethylene, polypropylene, or the like, polyester-based resin such as polyethylene, polypropylene, or the like, or polyvinylidene difluoride, a vinylidene difluoride-hexafluoropropylene copolymer, a vinylidene difluoride-perfluoroninylether copolymer, a vinylidene difluoride-tetrafluoroethylene copolymer, a vinylidene difluoride-trifluoroethylene copolymer, a vinylidene□ difluoride-fluoroethylene copolymer, a vinylidene difluoride-hexafluoroacetone copolymer, a vinylidene difluoride-ethylene copolymer, a vinylidene difluoride-propylene copolymer, a vinylidene difluoride-trifluoro propylene copolymer, a vinylidene difluoride-tetrafluoroethylene copolymer, a vinylidene difluoride-ethylene-tetrafluoroethylene copolymer, or the like. The porosity of the separator is not specifically limited, and may be any suitable porosity of a separator for lithium-ion secondary batteries.

A heat resistant layer including inorganic particles, for improving heat resistance, or an adhesive layer which includes an adhesive agent that adheres to an electrode to fix a battery device may be provided on the surface of the separator. The disclosed inorganic particles may be, for example, $Al_2O_3$, AlOOH, $Mg(OH)_2$, $SiO_2$ or the like. The adhesive agent may be, for example, a vinylidene difluoride-hexafluoropropylene copolymer, an acid-modified product of a vinylidene difluoride copolymer, a styrene-(meth) acrylic ester copolymer, or the like 1-4. Non-Aqueous Electrolyte The non-aqueous electrolyte is not specifically limited, and may be any suitable non-aqueous electrolyte for lithium-ion secondary batteries. The non-aqueous electrolyte may have a composition containing an electrolyte salt in a non-aqueous solvent. The non-aqueous solvent may be, for example: a cyclic carbonate ester-based solvent, such as propylene carbonate, ethylene carbonate, butylene carbonate, chloroethylene carbonate, fluoroethylene carbonate, vinylene carbonate, or the like; a cyclic ester-based solvent such as γ-butyrolactone, γ-valerolactone, or the like; a chain carbonate-based solvent such as dimethyl carbonate, diethyl carbonate, ethylmethyl carbonate, or the like; a chain ester-based solvent such as methylformate, methylacetate, methylbutyrate, ethyl propionate, propyl propionate, or the like; tetrahydrofuran or a derivative thereof; 1,3-dioxane, 1,4-dioxane; 1,2-dimethoxyethane; 1,4-dibutoxyethane; methyldiglyme; an ether-based solvent such as ethylene glycol monopropyl ether, propylene glycol monopropyl ether, or the like, a nitrile-based solvent such as acetonitrile, benzonitrile, or the like: dioxolane or a derivative thereof; ethylene sulfide; sulfolane; a sultone, or a derivative thereof. These solvents may be used alone or in combination. When at least two of the non-aqueous solvents are mixed and used, for the mixing ratio of the non-aqueous solvents, a suitable mixing ratio used may be applied.

The electrolyte salt may be, for example; an inorganic salt including one of lithium (Li), sodium (Na), or potassium (K), such as $LiClO_4$, $LiBF_4$, $LiAsF_6$, $LiPF_6$, $LIPF_{6-x}(C_nF_{2n+1})_x$ wherein 1<x<6, and n=1 or 2, LiSCN, LiBr, LiI, $Li_2SO_4$, $Li_2B_{10}Cl_{10}$, $NaClO_4$, NaI, NaSCN, NaBr, or $KClO_4$, KSCN; or an organic ionic salt, such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, stearyl sulfonic acid lithium, octyl sulfonic acid lithium, dodecylbenzenesulfonic acid lithium salt, or the like. These ionic compounds may be used alone or in combination. The concentration of the electrolyte salt is not specifically limited. In an embodiment, a non-aqueous electrolyte including a lithium compound (electrolyte salt) as described herein at a concentration of about 0.8 moles per liter (mol/L) to about 1.5 mol/L may be used.

In addition, the non-aqueous electrolyte may further include various additives. The additives may be, for example, an anode additive, a cathode additive, an ester-based additive, a carbonate ester-based additive, a sulfuric acid ester-based additive, a phosphate ester-based additive, a boric acid ester-based additive, an acid anhydride-based additive, an electrolyte-based additive, or a combination thereof. One additive may be added to the non-aqueous electrolyte, or a plurality of types of the additives may be added to the non-aqueous electrolyte.

2. Structural Features of Non-Aqueous Electrolyte Secondary Battery

Hereinafter, structural features of a non-aqueous electrolyte secondary battery according to an embodiment will be further described.

The cathode active material 1 used in a non-aqueous electrolyte secondary battery according to an embodiment is, as described herein, the coated cathode active material 100 of which the surface is coated with the coating layer (2).

The coating layer 2 may comprise $LiAlF_4$, LiF, and $Li_3AlF_6$. In an embodiment, the coating layer 2 consists of a mixture of $LiAlF_4$, LiF, and $Li_3AlF_6$.

An amount of $LiAlF_4$ in the coating layer 2 may be about 30 wt % to about 80 wt %, for example, about 40 wt % to about 65 wt %, based on a total weight of the coating layer.

An amount of LiF in the coating layer 2 may be about 1 wt % to about 30 wt %, or about 5 wt % to about 10 wt %, based on a total weight of the coating layer.

An amount of $Li_3AlF_6$ in the coating layer 2 may be about 1 wt % to about 70 wt %, or about 25 wt % to about 55 wt %, based on a total weight of the coating layer.

A weight ratio of LiF and $Li_3AlF_6$ in the coating layer may be about 1:2.5 to about 1:11. A weight ratio of LiF and $LiAlF_4$ in the coating layer may be about 1:6.5 to about 1:11. When the weight ratio of LiF and $Li_4AlF_6$ and the weight ratio of LiF and $LiAlF_4$ in the coating layer are within the ranges, the non-aqueous electrolyte secondary battery may have further improved battery capacity and capacity retention.

An amount of the coating layer is about 1 weight percent to about 10 weight percent, with respect to 100 weight percent of the cathode active material particle.

The composition of the coating layer 2 may be analyzed by, for example, an X-ray photoelectron spectroscopy (XPS).

Figure 2:
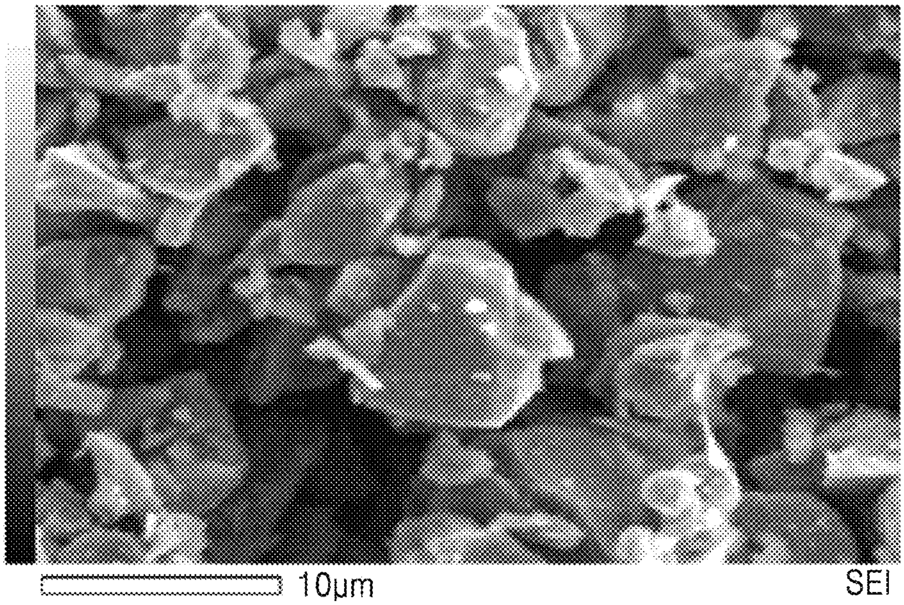
FIG. 2 is a scanning electron microscope ("SEM") image of an embodiment of a coated cathode active material.
Figure 3A:
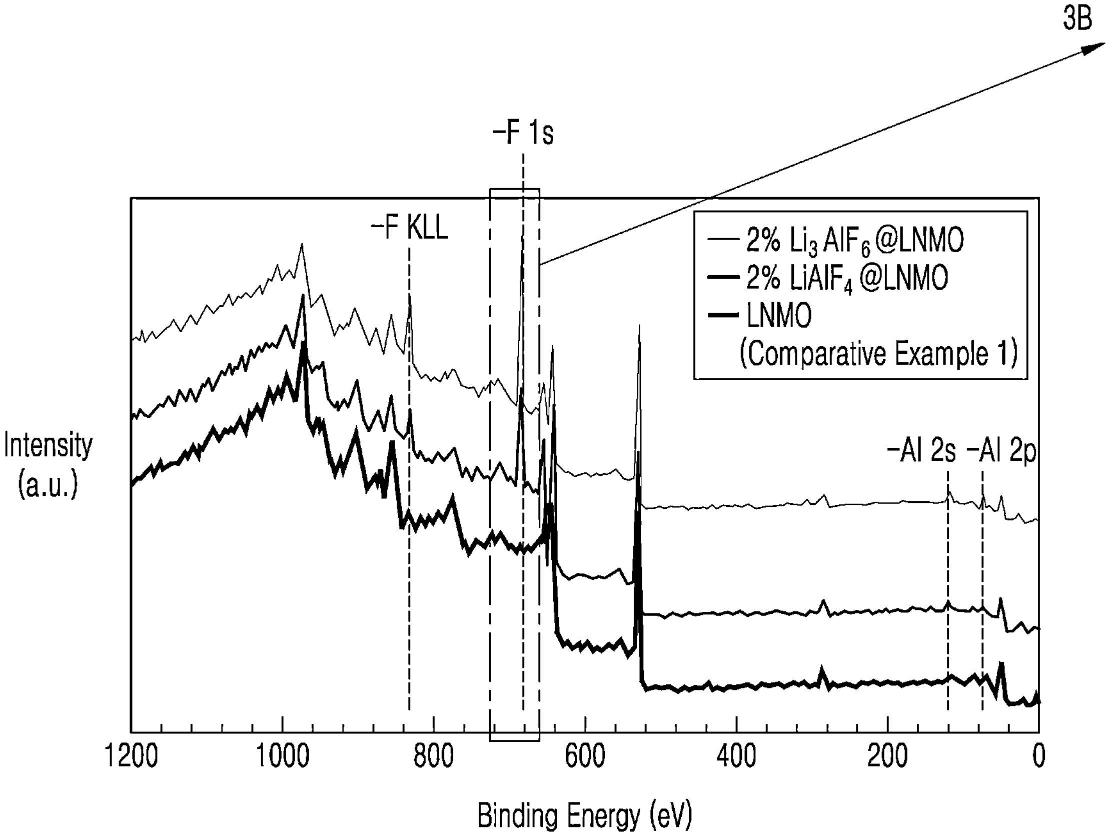
FIG. 3A is a graph of Intensity (arbitrary units (a.u.)) versus Binding Energy (electronvolts (eV)) showing the results of X-ray photoelectron spectroscopy analysis of a coating layer.
Figure 3B:
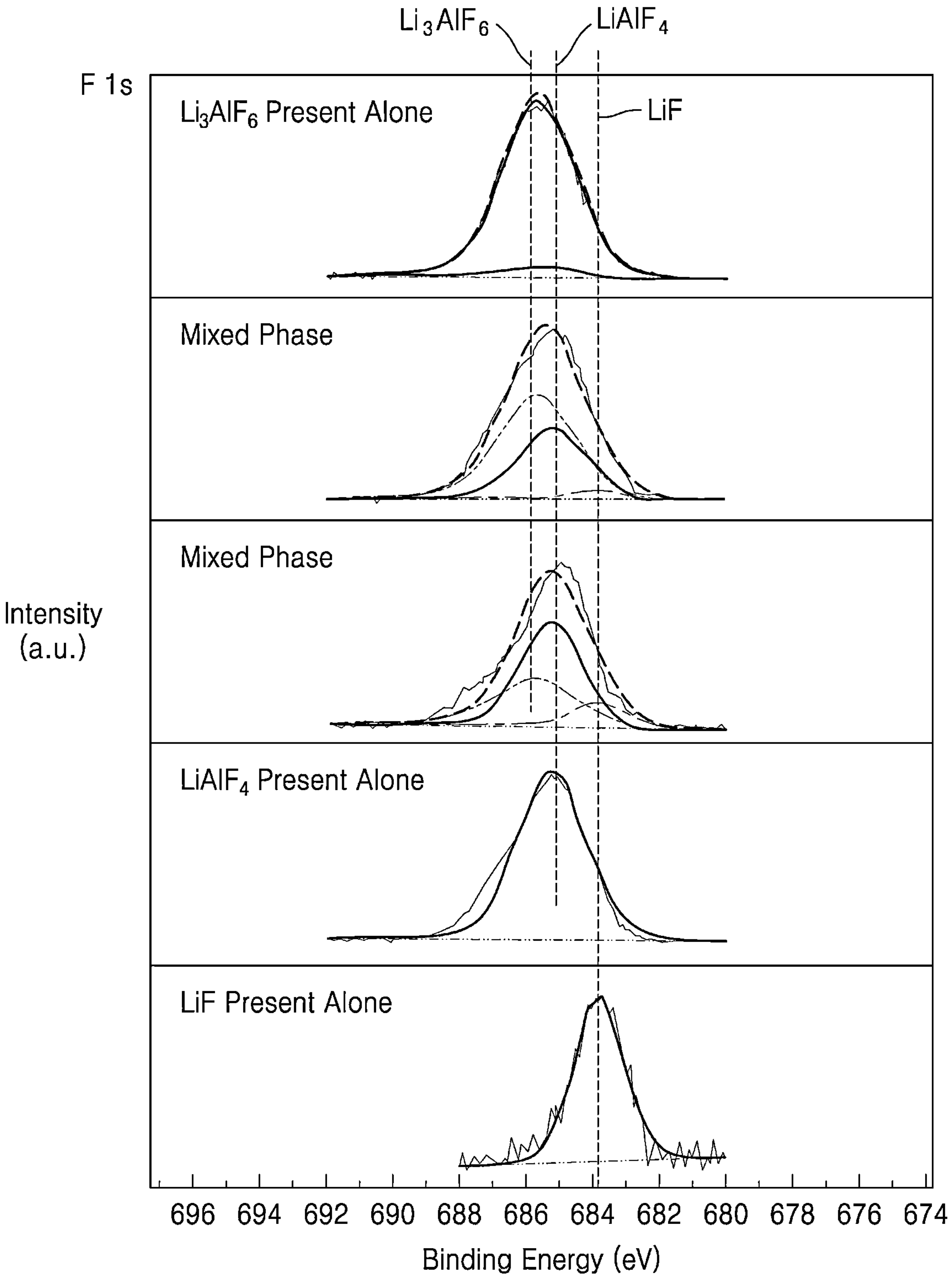
FIG. 3B is a graph of Intensity (a.u.) versus Binding Energy (eV) of the $F_{1s}$ peaks of FIG. 3A.

FIG. 2 is a scanning electron microscope ("SEM") image of a coated cathode active material according to an embodiment. FIGS. 3A and 3B are graphs showing the results of X-ray photoelectron spectroscopy analysis of the surface of the (coated) cathode active material 100 as shown in FIG. 2. Referring to FIGS. 3A and 3B, the composition of the surface of the (coated) positive electrode active material 100 can be seen for an uncoated positive electrode active material ("LNMO," corresponding to Comparative Example 1), a sample including 2% $Li_3AlF_6$ coating on LNMO, and a sample including 2% $LiAlF_4$ coating on LNMO. From the central position, the peak area, or waveforms of $F_{1s}$ spectrum peaks (apexes of the spectrum peaks) shown in FIG. 3B the amounts of components contained therein can be calculated. In addition, when $LiAlF_4$, LiF, and $LiAlF_6$ are contained at the disclosed ratios, the central position of the $F_{1s}$ spectrum peaks are found to be at about 685.05 eV to about 685.60 eV.

The coating layer 2 may coat at least a portion of the surface of the cathode active material 1. A coating amount of the coating layer 2, which as a whole is a mixture of $LiAlF_4$, LiF, and $Li_3AlF_6$, may be about 1 wt % to about 10 wt % or about 1 wt % to about 7 wt %, based on a total weight of the cathode active material 1.

In addition, the coating layer 2 may have a thickness of about 0.6 nm to about 9 nm, or a thickness of about 1 nm to about 5 nm. The thickness of the coating layer 2 may be confirmed by observing the cross-section of the formed coated layer by using a transmission electron microscope ("TEM").

Although the coating layer 2 contains a mixture of $LiAlF_4$. LiF, and $Li_3AlF_6$ as described herein, for example, the coating layer 2 may contain a component derived from the cathode active material 1.

The smaller the average secondary particle diameter of the coated cathode active material 100, the larger the specific surface area of the coated cathode active material 100. The larger the specific surface area of the coated cathode active material 100, the greater the charge/discharge capacity of the non-aqueous electrolyte secondary battery including the coated cathode active material may be. Accordingly, the average secondary particle diameter of the coated cathode active material 100 may be 10 μm or less, or about 1 μm to about 10 μm. The term "average secondary particle diameter" used herein indicates the number average particle diameter (D50) in the particle size distribution of particles obtained by light scattering or the like, and may be measured using a particle size distribution analyzer. In an aspect, the average secondary particle diameter may be measured using a scanning electron microscope ("SEM"). The average particle size of about 10-30 particles can be calculated using the SEM image 3 Method of Manufacturing Non-Aqueous Electrolyte Secondary Battery Hereinafter, a method of manufacturing a lithium-ion secondary battery using the disclosed coated cathode active material (100) will be further described.

First, the coated cathode active material 100 may be prepared according to the following processes.

As materials of the coating layer 2, a lithium precursor, an aluminum precursor, and a fluoride precursor are weighed to reach a target composition, and dissolved in water to prepare an aqueous solution, thus obtaining a coated cathode active material composition. The lithium precursor may be, for example, $LiNO_3$, the aluminum precursor may be, for example, $Al(NO_3)_3$, and the fluoride precursor may be, for example, $NH_4F$. The amounts of the lithium precursor, the aluminum precursor, and the fluoride precursor are stoichiometrically controlled to obtain the composition of the coating layer.

The coated cathode active material composition may contain, for example, lithium nitrate as the lithium precursor, aluminum nitrate as the aluminum precursor, and ammonium fluoride as the fluoride precursor.

Particles of the cathode active material 1 are added into the aqueous solution to prepare a mixture and then the mixture is stirred, for example, while the temperature is maintained at about 70° C. to about 90° C., within 8 hours, for example, for about 4 hours to about 8 hours.

Next, by removing water from the aqueous solution by evaporation and drying, and then thermal heating, for example, calcining the dried product, the coated cathode active material 100 with the coating layer 2 covering the surface of the cathode active material 1 may be obtained. The calcination may be performed at about 300° C. to about 500° C., or about 400° C.

When the calcination is performed, the coating layer contains $Li_3AlF_6$ and $LiAlF_4$, and LiF as well, as represented in Reaction schemes 1 and 2.

Reaction scheme 1

$$3LiNO_3 + Al(NO_3)_3 + 6NH_4F \xrightarrow{400^\circ\ C.} Li_3AlF_6 + 6N_2 + 12H_2O + 3O_2$$

$$LiNO_3+Al(NO_3)_3+4NH_4F \rightarrow LiAlF_4+4N_2+8H_2O+2O_2$$ Reaction scheme 2

In addition, it is confirmed that nearly all of the materials for the coating layer 2 added into the aqueous solutions are used in the reactions, and form the coating layer 2.

The cathode may be manufactured according to the following processes.

First, a mixture of the coated cathode active material 100 prepared as described herein, a conductive material, and a binder for the cathode in a desired ratio is dispersed in a cathode slurry solvent to form a cathode slurry. Subsequently, the cathode slurry is coated on a cathode current collector, and dried to form a cathode mixture layer. In addition, the method for the coating is not specifically limited. The method for the coating may be, for example, a knife coater method, a gravure coater method, a reverse roll coater method, a slit die coater method, or the like. Other coating processes described herein may be performed using the same method. Subsequently, the cathode mixture layer is pressed to a desired density with a press. Thus, the cathode is manufactured.

The anode is manufactured in the same manner as applied for the cathode. First, a mixture of materials for an anode mixture layer is dispersed in an anode slurry solvent to form an anode slurry. Subsequently, the anode slurry is coated on an anode current collector, and dried to form an anode mixture layer. Subsequently, the anode mixture layer is pressed to a desired density with a press. Thus, the anode is manufactured.

Subsequently, a separator is interposed between the cathode and the anode to manufacture an electrode assembly. Then, the electrode assembly is processed into a shape (for example, a cylindrical, prismatic, laminated, or button shape), and then accommodated in a container having the same shape. Then, a non-aqueous electrolyte is injected into the container to impregnate pores in the separator and voids of the cathode and the anode with the electrolyte. Thus, a lithium-ion secondary battery is manufactured.

4. Effects

The disclosed coated cathode active material 100 may improve battery capacity and capacity retention of the non-aqueous electrolyte secondary battery. The mechanism by which this effect may be obtained is as follows.

The coating layer 2 of the coated cathode active material 100 according to an embodiment is formed of a mixture of $LiAlF_4$, LiF, and $Li_3AlF_6$, as described herein. While not wanting to be bound by theory, it is understood that the three components provide different features, i.e., $LiAlF_4$ provides for high ionic conductivity, $Li_3AlF_6$ provides an increased difference in oxidation reduction potential, and LiF provides improved stability and ionic conductivity. When used as a mixture together, the $LiAlF_4$, LiF, and $Li_3AlF_6$ provide complementing properties thereof and exhibit the effects as described herein.

In an embodiment, the coating layer may cover part of the surface of the cathode active material particle, or the entire surface thereof.

The coated cathode active material according to an embodiment may be applicable to a solid secondary battery using a solid electrolyte, or an all-solid secondary battery.

In an embodiment, the all-solid secondary battery includes a solid electrolyte, and the solid electrolyte is a sulfide-based solid electrolyte, an oxide-based solid electrolyte, a halide-based solid electrolyte, a nitride-based solid electrolyte, or a combination thereof.

A material for the sulfide-based solid electrolyte may be, for example, $Li_2S—P_2S_5$, $Li_2S—P_2S_5—LiI$, $Li_2S—P_2S_5—LiCl$, $Li_2S—P_2S_5—LiBr$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (wherein m and n are positive numbers, and Z is Ge, Zn, Ga, or a combination thereof), $Li_2S—GeS_2$, $Li_2S—SiS_2—Li_3PO_4$, $Li_2S—SiS_2—Li_xMO_y$ (wherein x and y are positive numbers, and M is P, Si, Ge, B, Al, Ga, In, or a combination thereof), $Li_{10}GeP_2S_{12}$, or the like.

A material for the oxide-based solid electrolyte may be, for example, $Li_2O—B_2O_3—P_2O_5$, $Li_2O—SiO_2$, LiLaTaO (for example, $Li_5La_3Ta_2O_{12}$). LiLaZrO (for example, $Li_7La_3Zr_2O_{12}$), LiBaLaTaO (for example, $Li_6BaLa_2Ta_2O_{12}$), $Li_{1+x}Si_xP_{1-x}O_4$ (wherein $0\le x<1$, and for example, $Li_{3.6}Si_{0.6}P_{0.4}O_4$), $Li_{1+x}Al_xGe_{2-x}(PO_4)_3$ (wherein $0\le x\le 2$), $Li_{1+x}Al_xTi_{2-x}(PO_4)_3$ (wherein $0\le x\le 2$), $Li_3PO_{(4-3/2x)}N_x$ (wherein $0\le x<1$), or the like. In addition, a material for the nitride-based solid electrolyte may be, for example, $Li_3N$ or the like, and a material for the halide-based solid electrolyte may be, for example, LiI, $Li_3InCl_6$, or the like.

The electrolyte may be a halide-based solid electrolyte, and the halide-based solid electrolyte may include $Li_3InCl_6$.

In the manufacture of the non-aqueous electrolyte secondary battery according to an embodiment, the cathode may include the coated cathode active material according to an embodiment and a solid electrolyte. The cathode may further include a conductive material.

An amount of the solid electrolyte in the cathode may be about 15 parts to about 35 parts by weight, for example, about 20 parts to about 30 parts by weight, with respect to 100 parts by weight of the total weight of the cathode. In the manufacture of the non-aqueous electrolyte secondary battery according to an embodiment, the anode may be a lithium anode or a lithium alloy anode.

However, various changes may be made to an extent without departing from the spirit of the disclosure.

Hereinafter, one or more embodiments of the present disclosure will now be described in further detail with reference to the following examples. However, these examples are only for illustrative purposes and are not intended to limit the scope of the present disclosure to the following examples.

EXAMPLES

Example 1

Preparation of Coated Cathode Active Material

First, reagents $LiNO_3$, $Al(NO_3)_3$, and $NH_4F$ as materials for a coating layer were weighed to reach a target composition as represented in Table 1, made into separate aqueous solutions, and then mixed together. $LiNi_{x2}Co_{y2}Mn_{z2}O_2$ ("LNMO") (wherein x2=0.9, y2=0.5, and z2=0.5) as a cathode active material was added to the mixed solution and stirred at 80° C. for about 6 hours A composition of the aqueous solution for forming the coating layer was adjusted such that a proportion of the coating layer reached 1 weight percent (wt %), based on a total weight (100 wt %) of the cathode active material. Water was evaporated from the aqueous solution to obtain a precursor, and the precursor was dried under vacuum and calcined at 400° C. for 1 hour to thereby obtain a coated cathode active material.

Properties of Coated Cathode Active Material

Figure 4A:
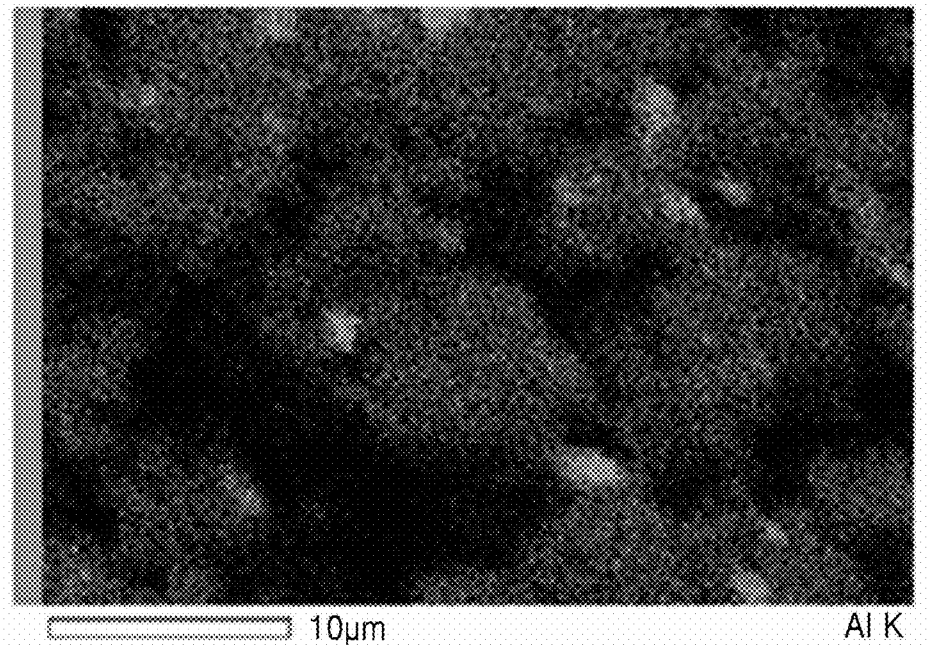
FIG. 4A is an image obtained by X-ray photoelectron spectroscopy ("XPS") analysis of a coating layer of a coated cathode active material, showing the distribution of Al on a lithium nickel manganese oxide ("LNMO") surface.
Figure 4B:
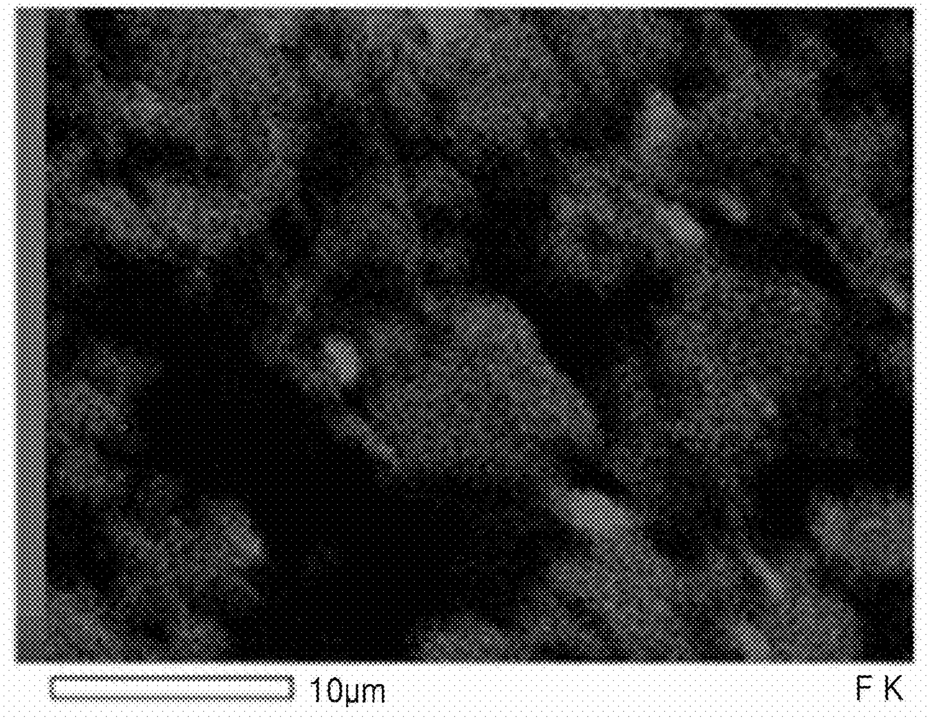
FIG. 4B is an image obtained by XPS analysis of the coating layer of the coated cathode active material, showing the distribution of F on the LNMO surface.

To confirm that the surface of the cathode active material layer was coated with the coating layer, the coated cathode active material after the calcination was observed by scanning electron microscopy ("SEM") and energy-dispersive X-ray spectroscopy ("EDS"). As a result of the observation, it was confirmed that $LiAlF_4$ was present as nanoparticles on the surface of the cathode active material (LNMO). As a result of X-ray photoelectron spectroscopy ("XPS"), it was confirmed that elements Al and F were present on the surface of the LNMO (see FIGS. 4A and 4B). It was confirmed that the surface of the cathode active material was coated by the coating layer having the desired composition.

In addition, by analyzing $F_{1s}$ and $Al_{2p}$ spectra from the XPS measurement, a spectrum of the mixed components of $LiAlF_4$, LiF, and $Li_3AlF_6$ could be obtained from the coated layer, and accordingly, it was found that the coating layer of Example 1 was formed in a mixed phase including $LiAlF_4$, LiF, and $Li_3AlF_6$ in a ratio as represented in Table 1.

Manufacture of Non-Aqueous Electrolyte Secondary Battery

To evaluate a non-aqueous electrolyte secondary battery using the obtained coated cathode active material, a Type 2032 coin cell using a lithium anode was manufactured. Herein, a cathode was manufactured by mixing the disclosed coated cathode active material, acetylene black ("AB"; Denka Black, FX-35, Denka Co., Ltd.) and polyvinylidene fluoride (a ratio of 8:1:1 by weight) and coating the mixture on an aluminum foil. The electrolyte used was 1 mole per liter (mol/L) $LiPF_6$ EC:DMC (1:1 volume ratio (v/v %)), and the separator used was a porous polypropylene membrane (Celgard 2400). In addition, the coin cell was assembled in a grove box under an argon gas atmosphere.

Evaluation of Non-Aqueous Electrolyte Secondary Battery

Using a battery cycler (8CH Charge/Discharge Unit 10V 1A HJ 1001SM8A, HOKUTO DENKO), the manufactured non-aqueous electrolyte secondary battery was charged and discharged under a constant current condition of 46.5 milliamperes per gram (mA/g) in a voltage range of 3.0 volts (V) to 5.0 V, and evaluated. The results of the evaluation are represented in Table 1. In addition, the capacity retention was calculated from a ratio of the discharge capacity after 100 cycles to the initial discharge capacity.

Examples 2 and 3

Non-aqueous electrolyte secondary batteries were manufactured and evaluated using the same method as in Example 1, except that coating layer materials, which are used to prepare the coated cathode active material, were weighed to reach a desired composition as represented in Table 1. The results of the evaluation are represented in Table 1.

Comparative Example 1

A non-aqueous electrolyte secondary battery was manufactured and evaporated using the same method as in Example 1, except that the cathode active material was not coated. The results of the evaluation are represented in Table 1.

Comparative Examples 2-4

Non-aqueous electrolyte secondary batteries were manufactured and evaluated using the same method as in Example 1, except that the coating layer materials, which are used to prepare the coated cathode active material, were weighed to reach a desired composition as represented in Table 1. The results of the evaluation are represented in Table 1.

TABLE 1

| Example | Coating layer present or not | Coating Concentration (wt %) | Coating layer thickness (nm) | Coating layer components (wt %) $LiAlF_4$ | LiF | $Li_3AlF_6$ | Initial discharge capacity (mAh) | Initial efficiency (%) | Capacity retention (%) |
|---|---|---|---|---|---|---|---|---|---|
| Example 1 | Present | 1 | 1 | 55 | 5 | 40 | 140 | 82 | 96 |
| Example 2 | Present | 2 | 2 | 65 | 10 | 25 | 143 | 87 | 98 |
| Example 3 | Present | 5 | 5 | 40 | 5 | 55 | 139 | 82 | 96 |
| Comparative Example 1 | Not Present | — | — | — | — | — | 127 | 88 | 94 |
| Comparative Example 2 | Present | 0.5 | 0.5 | 0 | 0 | 100 | 114 | 77 | 94 |
| Comparative Example 3 | Present | 10 | 10 | 5 | 0 | 95 | 115 | 71 | 93 |
| Comparative Example 4 | Present | 2 | 2 | 100 | 0 | 0 | 127 | 80 | 94 |

In each of Examples 1 to 3 and Comparative Examples 1 to 4 the cathode active material is $LiNi_{x2}Co_{y2}Mn_{z2}O_2$ ("LNMO") wherein x2=0.9, y2=0.5, and z2=0.5.

As shown in Table 1, it was found that when the coating layer of the coated cathode active material was formed as a mixed phase of $LiAlF_4$, LiF, and $Li_3AlF_6$, a non-aqueous electrolyte secondary battery excellent in terms of all of initial discharge capacity, initial efficiency, and cycle characteristics could be manufactured.

In addition, it was confirmed that, as long as $LiAlF_4$, LiF, and $Li_3AlF_6$ were included, even with various changes in the amount ratio or coating amounts (coating concentration) thereof, the same effect could be obtained.

Example 4

A non-aqueous electrolyte secondary battery was manufactured and evaporated using the same method as in Example 1, except that $LiCoO_2$ ("LCO") was used as the cathode active material, and the charge/discharge evaluation was performed under a constant current condition of 137 mA/g in a voltage range of 3.0 volts (V) to 5.0 V. The results of the evaluation are represented in Table 2.

Examples 5 and 6

Non-aqueous electrolyte secondary batteries were manufactured and evaluated using the same method as in Example 4, except that the coating layer materials, which are used to prepare the coated cathode active material, were weighed to reach a desired composition as represented in Table 2. The results of the evaluation are represented in Table 2.

Comparative Example 5

A non-aqueous electrolyte secondary battery was manufactured and evaporated using the same method as in Example 4, except that the cathode active material was not coated. The results of the evaluation are represented in Table 2.

Comparative Examples 6 and 7

Non-aqueous electrolyte secondary batteries were manufactured and evaluated using the same method as in Example 4, except that the coating layer materials, which are used to prepare the coated cathode active material, were weighed to reach a desired composition as represented in Table 2. The results of the evaluation are represented in Table 2.

TABLE 2

| Example | Coating layer present or not | Coating concentration (wt %) | Coating layer thickness (nm) | Coating layer's components (wt %) $LiAlF_4$ | LiF | $Li_3AlF_6$ | Initial discharge capacity (mAh) | Initial Efficiency (%) | Capacity retention (%) |
|---|---|---|---|---|---|---|---|---|---|
| Example 4 | Present | 1 | 1 | 55 | 5 | 40 | 162 | 86.6 | 96 |
| Example 5 | Present | 2 | 2 | 55 | 10 | 25 | 164 | 82.9 | 94 |

TABLE 2-continued

| Example | Coating layer present or not | Coating concentration (wt %) | Coating layer thickness (nm) | Coating layer's components (wt %) LiAlF$_4$ | LiF | Li$_3$AlF$_6$ | Initial discharge capacity (mAh) | Initial Efficiency (%) | Capacity retention (%) |
|---|---|---|---|---|---|---|---|---|---|
| Example 6 | Present | 5 | 5 | 40 | 5 | 55 | 161 | 84.3 | 95 |
| Comparative Example 5 | Not Present | — | — | — | — | — | 161 | 85.5 | 48 |
| Comparative Example 6 | Present | 0.5 | 0.5 | 0 | 0 | 100 | 160 | 89.6 | 86 |
| Comparative Example 7 | Present | 10 | 10 | 5 | 0 | 95 | 160 | 85.9 | 85 |

For each of Examples 4 to 6 and Comparative Examples 5 to 7, the cathode active material is $LiCoO_2$ (LCO).

As shown in Table 2, it was found that when the coating layer of the coated cathode active material was formed as a mixed phase of $LiAlF_4$, LiF, and $Li_3AlF_6$, a non-aqueous electrolyte secondary battery excellent in terms of all of initial discharge capacity, initial efficiency, and cycle characteristics could be manufactured.

Example 7

A non-aqueous electrolyte secondary battery was manufactured and evaporated using the same method as in Example 4, except that the charge/discharge evaluation was performed under a constant electric field condition of 137 mA/g in a voltage range of 3.0 V to 5.0 V. The results of the evaluation are represented in Table 3.

Examples 8 and 9

Non-aqueous electrolyte secondary batteries were manufactured and evaluated using the same method as in Example 7, except that the coating layer materials, which are used to prepare the coated cathode active material, were weighed to reach a target composition as represented in Table 3. The results of the evaluation are represented in Table 3.

Comparative Examples 8 and 9

Non-aqueous electrolyte secondary batteries were manufactured and evaluated using the same method as in Example 7, except that the coating layer materials, which are used to prepare the coated cathode active material, were weighed to reach a target composition as represented in Table 3. The results of the evaluation are represented in Table 3.

For each of Examples 7 to 9 and Comparative Examples 8 to 9, the cathode active material is $LiCoO_2$ (LCO).

As shown in Table 3, it was found that even with a change in the charge/discharge test condition, the non-aqueous electrolyte secondary battery in which the coating layer of the coated cathode active material was formed with a mixed phase of $LiAlF_4$, LiF, and $Li_3AlF_6$, was excellent in terms of all of initial discharge capacity, initial efficiency, and cycle characteristics.

Example 10

Using the coated cathode active material, which was prepared according to the same method as in Example 1, except that the coating amount of the coating layer was changed to 2 wt %, based on a total weight of the cathode active material, and an all-solid secondary battery was manufactured in the following order, and evaluated.

Preparation of Solid Electrolyte

A solid electrolyte was synthesized in following manner. In the case of preparing $Li_3YCl_6$ as the solid electrolyte, $LiCl/YCl_3$ with a molar ratio of 3:1 was loaded into a zirconium oxide pot using zirconium oxide balls having a diameter of 5 millimeters (mm). This process was performed in a glove box filled with argon. The mixed material was ground with a planetary ball mill at 500 rpm for 50 hours. In the case of preparing $Li_3InCl_6$ as the solid electrolyte, the solid electrolyte was synthesized in the same manner with a $LiCl/InCl_3$ molar ratio of 3:1.

Manufacture of all-Solid Secondary Battery

Next, an all-solid secondary battery was manufactured using prepared coated cathode active material and solid

TABLE 3

| Example | Coating layer present or not | Coating Concentration (wt %) | Coating layer thickness (nm) | Coating layer components (wt %) LiAlF$_4$ | LiF | Li$_3$AlF$_6$ | Initial discharge capacity (mAh) | Initial Efficiency (%) | Capacity retention (%) |
|---|---|---|---|---|---|---|---|---|---|
| Example 7 | Present | 1 | 1 | 55 | 5 | 40 | 208 | 88.4 | 75 |
| Example 8 | Present | 2 | 2 | 65 | 10 | 25 | 194 | 87.6 | 76 |
| Example 9 | Present | 5 | 5 | 40 | 5 | 55 | 190 | 86.3 | 76 |
| Comparative Example 8 | Present | 0.5 | 0.5 | 0 | 0 | 100 | 201 | 92.0 | 37 |
| Comparative Example 9 | Present | 10 | 10 | 5 | 0 | 95 | 188 | 84.3 | 48 |

electrolyte. A Li—In alloy anode formed of a metal lithium (having a thickness of 200 micrometers (μm)) and an indium foil (having a thickness of 400 μm) was used as an anode.

$Li_3YCl_6$ was used as a solid electrolyte.

A mixed material of the coated cathode active material ("LNMO") obtained according to Example 1, a solid electrolyte ($Li_3InCl_6$), and a conductive agent (acetylene black ("AB")) in a weight ratio of 66.5:28.5:5 was used as a cathode. The cathode, the solid electrolyte membrane, and the anode were stacked and pressed with a pressure of 3 tons per square centimeter (ton/$cm^2$), to thereby obtain a test cell.

Evaluation of all-Solid Secondary Battery

The manufactured all-solid secondary battery was cycled using a charge/discharge measurement system (8CH Charge/Discharge Unit 10V 1A HJ 1001SM8A, HOKUTO DENKO), using a constant current condition of 5 μA in a voltage range of 2.0 V to 6.0 V The results of the evaluation are represented in Table 4. In addition, the capacity retention was calculated from a ratio of the discharge capacity after 10 cycles to the initial discharge capacity.

Comparative Example 10

A non-aqueous electrolyte secondary battery was manufactured and evaluated using the same method as in Example 10, except that the cathode active material was not coated. The results of the evaluation are represented in Table 4.

TABLE 4

| Example | Coating layer present or not | Coating Concentration (wt %) | Coating layer thickness (nm) | Coating layer components (wt %) $LiAlF_4$ | LiF | $Li_3AlF_6$ | Initial discharge capacity (mAh) | Initial Efficiency (%) | Capacity retention (%) |
|---|---|---|---|---|---|---|---|---|---|
| Example 10 | Present | 2 | 2 | 55 | 5 | 40 | 25 | 30 | 60 |
| Comparative Example 10 | Not Present | — | — | — | — | — | 13 | 15 | 3 |

The cathode active material in Example 10 and Comparative Example 10 was LNMO.

As shown in Table 4, it was found that even in the case of an all-solid secondary battery, when the coating layer of the coated cathode active material was formed with a mixed phase of $LiAlF_4$, LiF, and $Li_3AlF_6$, all of initial discharge capacity, initial efficiency, and cycle characteristics were excellent.

In addition, from the results of Examples 1-9 and Comparative Examples 1-9, it was found that the all-solid secondary battery of Example 10, which included all of $LiAlF_4$, LiF, and $Li_3AlF_6$, was excellent in terms of all of initial discharge capacity, initial efficiency, and cycle characteristics, compared to an all-solid secondary battery including only one or two of $LiAlF_4$, LiF, and $Li_3AlF_6$.

According to an embodiment, the coated cathode active material may further improve, e.g., increase, battery capacity and capacity retention of a non-aqueous electrolyte secondary battery.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A coated cathode active material comprising:

a cathode active material particle; and a coating layer on a surface of the cathode active material particle, wherein the coating layer comprises $LiAlF_4$, LiF, and $Li_3AlF_6$, wherein the coating layer comprises about 1 weight percent to about 30 weight percent of LiF with respect to 100 weight percent of a total weight of the coating layer.

2. The coated cathode active material of claim 1, wherein the coating layer has a thickness of about 0.6 nanometers to about 9 nanometers.

3. The coated cathode active material of claim 1, wherein an average secondary particle diameter of the coated cathode active material is 10 micrometers or less.

4. The coated cathode active material of claim 1, wherein when analyzed by X-ray photoelectron spectroscopy, the coating layer exhibits an Fis spectrum having a central position at about 685.05 electronvolts to about 685.60 electronvolts.

5. The coated cathode active material of claim 1, wherein the coating layer comprises about 30 weight percent to about 80 weight percent of $LiAlF_4$, about 5 weight percent to about 10 weight percent of LiF, and about 1 weight percent to about 70 weight percent of $Li_3AlF_6$, with respect to 100 weight percent of a total weight of the coating layer.

6. The coated cathode active material of claim 1, wherein a weight ratio of LiF to $Li_3AlF_6$ in the coating layer is about 1:2.5 to about 1:11, and a weight ratio of LiF to $LiAlF_4$ in the coating layer is about 1:6.5 to about 1:11.

7. The coated cathode active material of claim 1, wherein an amount of the coating layer is about 1 weight percent to about 10 weight percent, with respect to 100 weight percent of the cathode active material particle.

8. The coated cathode active material of claim 1, wherein the cathode active material particle comprises a cathode active material having a spinel structure.

9. The coated cathode active material of claim 1, wherein the cathode active material particle comprises a ternary lithium transition metal oxide represented by $LiCoO_2$, $Li_{a1}Ni_{x1}Co_{y1}Al_{z1}O_2$, wherein $0.95 \leq a1 \leq 1.2$, $0 \leq x1 < 1$, $0 \leq y1 < 1$, and $0 \leq z1 < 1$, $Li_{a2}Ni_{x2}CO_{y2}Mn_{z2}O_2$, wherein $0.9 \leq a2 \leq 1.2$, $0 \leq x2 < 1$, $0 \leq y2 < 1$, and $0 \leq z2 < 1$, or a combination thereof.

10. A cathode comprising the coated cathode active material of claim 1.

11. A non-aqueous electrolyte secondary battery comprising:

a cathode comprising the coated cathode active material of claim 1;

an anode; and an electrolyte interposed between the cathode and the anode.

12. The non-aqueous electrolyte secondary battery of claim 11, wherein the electrolyte comprises a solid electrolyte, and the solid electrolyte comprises a sulfide solid electrolyte, an oxide solid electrolyte, a halide solid electrolyte, a nitride solid electrolyte, or a combination thereof.

13. The non-aqueous electrolyte secondary battery of claim 12, wherein the electrolyte is a halide solid electrolyte comprising $Li_3InCl_6$.

14. The non-aqueous electrolyte secondary battery of claim 11, wherein the cathode comprises the coated cathode active material and a solid electrolyte on the cathode active material.

15. The non-aqueous electrolyte secondary battery of claim 11, wherein the non-aqueous electrolyte secondary battery is an all-solid secondary battery.

16. A method of preparing a coated cathode active material, the method comprising:

mixing a cathode active material, a lithium precursor, an aluminum precursor, and a fluoride precursor to obtain a coated cathode active material composition;

treating the coated cathode active material composition at about 60° C. to about 95° C. to obtain a precursor; and heat-treating the precursor, to prepare the coated cathode active material of claim 1.

17. The method of claim 16, wherein the lithium precursor comprises lithium nitrate, the aluminum precursor comprises aluminum nitrate, and the fluoride precursor comprises ammonium fluoride.

18. The method of claim 16, wherein the heat-treating comprises heat-treating at about 300° C. to about 500° C.

19. The method of claim 16, further comprising before the heat-treating of the precursor vacuum-drying the precursor.

20. The method of claim 16, wherein the mixing comprises mixing for 8 hours or less at a temperature of about 70° C. to about 90° C.

21. The coated cathode active material of claim 1, wherein the cathode active material particle comprises a first cathode active material particle, and a second cathode active material particle, and the coating layer is on a surface of the first cathode active material particle and a surface of the second cathode active material particle.

22. A non-aqueous electrolyte secondary battery comprising:

a cathode comprising a cathode active material particle comprising $LiCoO_2$, $Li_{a1}Ni_{x1}Co_{y1}Al_{z1}O_2$, wherein $0.9 \le a1 \le 1.2$, $0 \le x1 < 1$, $0 \le y1 < 1$, and $0 \le z1 < 1$, $Li_{a2}Ni_{x2}CO_{y2}Mn_{z2}O_2$, wherein $0.9 \le a2 \le 1.2$, $0 \le x2 < 1$, $0 \le y2 < 1$, and $0 \le z2 < 1$, or a combination thereof, and a coating layer comprising $LiAlF_4$, LiF, and $Li_3AlF_6$ on a surface of the cathode active material particle;

an anode; and a solid electrolyte comprising a halide solid electrolyte interposed between the cathode and the anode.

* * * * *